(12) United States Patent
Andersson et al.

(10) Patent No.: US 9,761,001 B2
(45) Date of Patent: Sep. 12, 2017

(54) FILTERED SHADOW MAPPING

(71) Applicant: Intel Corporation, Santa Clara, CA (US)

(72) Inventors: Magnus Andersson, Helsingborg (SE); Jon N. Hasselgren, Bunkeflostrand (SE); Carl J. Munkberg, Malmo (SE); Tomas Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 71 days.

(21) Appl. No.: 14/575,197

(22) Filed: Dec. 18, 2014

(65) Prior Publication Data

US 2016/0093098 A1 Mar. 31, 2016

Related U.S. Application Data

(60) Provisional application No. 62/055,038, filed on Sep. 25, 2014.

(51) Int. Cl.
| | |
|---|---|
| *G06T 7/00* | (2017.01) |
| *G06T 11/40* | (2006.01) |
| *G06T 13/20* | (2011.01) |
| *G06T 15/04* | (2011.01) |
| *G06T 15/60* | (2006.01) |

(52) U.S. Cl.
CPC ............ *G06T 7/0071* (2013.01); *G06T 11/40* (2013.01); *G06T 13/20* (2013.01); *G06T 15/04* (2013.01); *G06T 15/60* (2013.01); *G06T 2215/12* (2013.01)

(58) Field of Classification Search
CPC ....... G06T 15/60; G06T 15/005; G06T 15/06; G06T 2215/12; G06T 5/008; G06T 7/194; G06T 15/00; G06T 15/205; G06T 7/507; G06T 15/08; G06T 17/00; G06T 2207/20201; G06T 5/50; G06T 7/215; G06T 7/50; G06T 7/579; G06T 15/40
See application file for complete search history.

(56) References Cited

U.S. PATENT DOCUMENTS

2007/0181687 A1* 8/2007 Fukushima ........ H04N 5/23212
235/454

OTHER PUBLICATIONS

Hadwiger et al., GPU-Accelerated Deep Shadow Maps for Direct Volume Rendering, Graphics Hardware (2006), 5 pages.*
Akenine-Moller, T., et al., "Stochastic Rasterization using Time Continuous Triangles," in Graphics Hardware (2007) (11 pages).
Andersson, M., et al., "Depth Buffer Compression for Stochastic Motion Blur Rasterization," in High Performance Graphics (2011), (10 pages).
Annen, T., et al., "Convolution Shadow Maps," In Proceedings of EGSR (2007) (10 pages).

(Continued)

*Primary Examiner* — Haixia Du
(74) *Attorney, Agent, or Firm* — Trop Pruner & Hu, P.C.

(57) ABSTRACT

A layered, filtered shadow mapping algorithm may be used for motion blurred shadows. The algorithm is divided into two passes, namely a shadow pass and a lighting pass. The shadow pass renders the scene using stochastic rasterization and generates a time-dependent shadow map augmented with per-sample motion vectors. The subsequent lighting pass renders the scene from the camera's point of view, and performs a shadow query for each sample seen from the camera.

30 Claims, 13 Drawing Sheets

(56) References Cited

OTHER PUBLICATIONS

Annen, T., et al., "Exponential Shadow Maps," in Proceedings of Graphics Interface (2008) (7 pages).

Donnelly, W., et al., "Variance Shadow Maps," In Symposium on Interactive 3D Graphics and Games (2006) (5 pages).

Durand, F., et al., "A Frequency Analysis of Light Transport," ACM Transactions on Graphics, (2005) (13 pages).

Egan, K., et al., "Frequency Analysis and Sheared Filtering for Shadow Light Fields of Complex Occluders," ACM Transactions on Graphics, vol. 30, No. 2, Article 9, (2011) (13 pages).

Egan, K., et al., "Frequency Analysis and Sheared Reconstruction for Rendering Motion Blur," ACM Transactions on Graphics, vol. 28, No. 3, (2009) (13 pages).

Egan, K., et al., "Practical Filtering for Efficient Ray-Traced Directional Occlusion," ACM Transactions on Graphics, vol. 30, No. 6, (2011) (10 pages).

Gribel, C.J., et al., "High-Quality Spatio-Temporal Rendering using Semi-Analytical Visibility," ACM Transactions on Graphics , vol. 30, No. 4 (2011) (11 pages).

Guertin, J.P., et al., "A fast and stable feature-aware motion blur filter," In HPG (2014), ACM/Eurographics, vol. 33, No. 2 (10 pages).

Haeberli, P., et al., "The Accumulation Buffer: Hardware Support for High-Quality Rendering," in Computer Graphics (Proceedings of SIGGRAPH 90) (1990), vol. 24, No. 4, ACM (10 pages).

Laine, S., et al., "Efficient Triangle Coverage Tests for Stochastic Rasterization," NVIDIA Technical Report, (2011) (3 pages).

Lauritzen, A., et al., "Layered Variance Shadow Maps," in Graphics Interface (2008) (8 pages).

Lehtinen, J., et al., "Temporal Light Field Reconstruction for Rendering Distribution Effects," ACM Transactions on Graphics, vol. 30, No. 4 (2011) (12 pages).

Lokovic, T., et al., "Deep Shadow Maps," in Proceedings of SIGGRAPH 2000 (2000), ACM, (8 pages).

McGuire, M., et al., "A Reconstruction Filter for Plausible Motion Blur," in Symposium on Interactive 3D Graphics and Games (2012) (8 pages).

McGuire, M., et al., "Colored Stochastic Shadow Maps," in Symposium on Interactive 3D Graphics and Games (2011) ACM (8 pages).

McGuire, M., et al., "Real-Time Stochastic Rasterization on Conventional GPU Architectures," in High Performance Graphics (2010) (10 pages).

Mehta, S., et al., "Axis-Aligned Filtering for Interactive Physically-based Diffuse Indirect Lighting," ACM Transactions on Graphics, vol. 31, No. 6, Article 163, (2012) (10 pages).

Mehta, S., et al., "Axis-Aligned Filtering for Interactive Sampled Soft Shadows," ACM Transactions on Graphics, vol. 31, No. 6, Article 163, (2012) (12 pages).

Mehta, S., et al., "Factored Axis-aligned Filtering for Rendering Multiple Distribution Effects," ACM Transactions on Graphics, vol. 33, No. 4, (2014) (14 pages).

Munkberg, J., et al., "Layered Light Field Reconstruction for Defocus and Motion Blur," in Computer Graphics Forum, vol. 33, No. 4, (2014) (12 pages).

Navarro, F., et al., "Motion Blur Rendering: State of the Art," in Computer Graphics Forum, vol. 30, No. 1 (2011) (24 pages).

Reeves, W., et al., "Rendering Antialiased Shadows with Depth Maps," in Computer Graphics (Proceedings of SIGGRAPH 87) (1987), vol. 21, No. 4 (9 pages).

Vaidyanathan, K., et al., "Layered Light Field Reconstruction for Defocus Blur," in ACM Transactions on Graphics No. 34, No. 2, Article 23, (2015) (12 pages).

Wald, I., et al., "Embree: A Kernel Framework for Efficient CPU Ray Tracing," in ACM Transactions on Graphics, vol. 33, No. 4 (2014) (8 pages).

Williams, L., "Casting curved shadows on curved surfaces," in Computer Graphics, (Proceedings of SIGGRAPH 78) (1978), vol. 12, (5 pages).

Yang, B., et al., "Variance Soft Shadow Mapping," in Computer Graphics Forum, vol. 29, No. 7 (2010), (8 pages).

\* cited by examiner

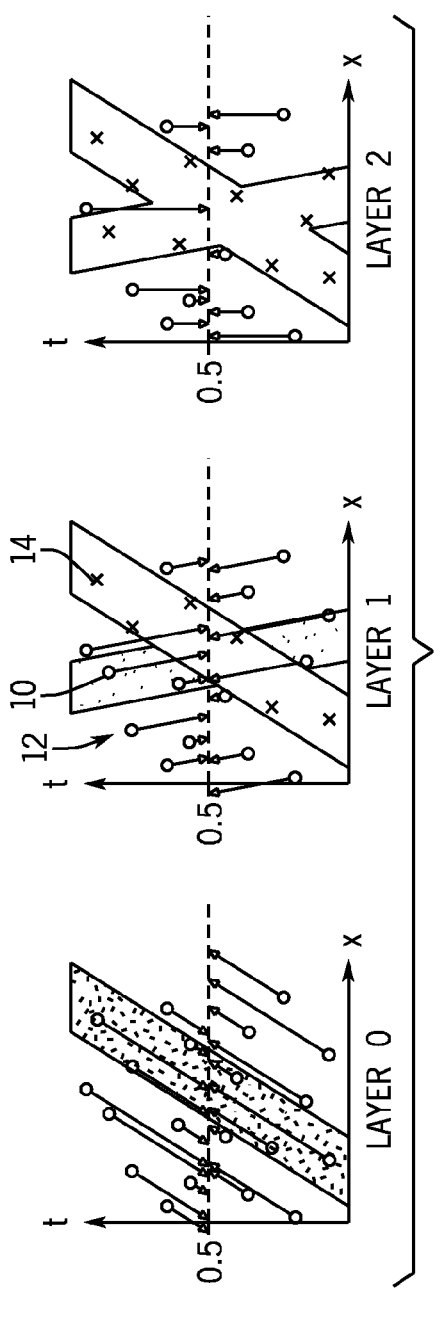
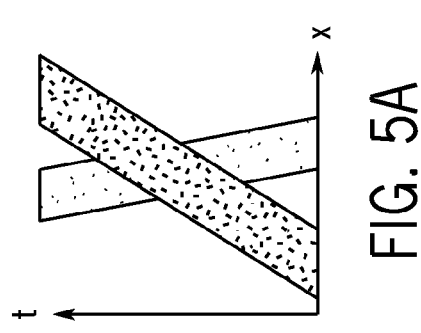
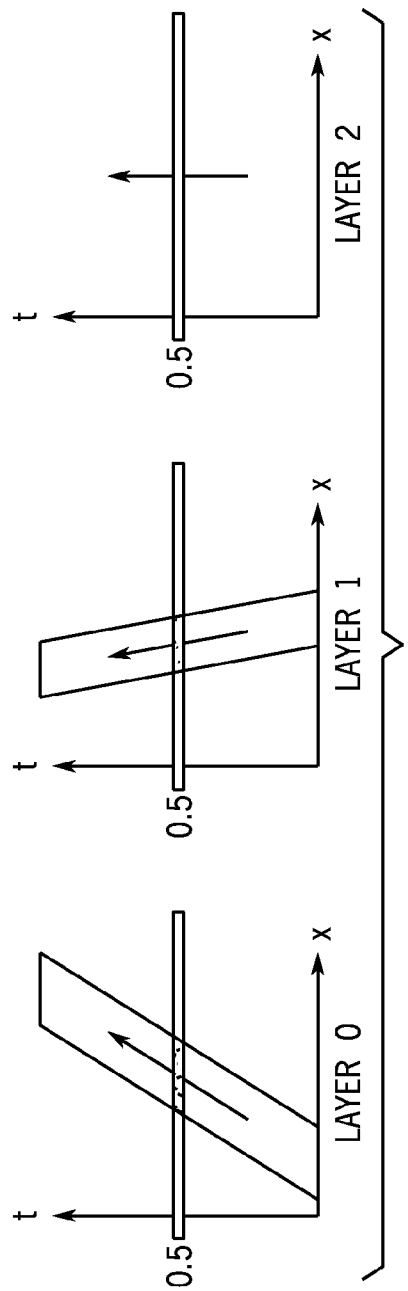
FIG. 5A
FIG. 5B
FIG. 5C

FILTERED SHADOW MAPPING

CROSS-REFERENCE TO RELATED APPLICATIONS

This is a non-provisional application based on provisional application Ser. No. 62/055,038, filed on Sep. 25, 2014, hereby expressly incorporated by reference herein.

BACKGROUND

Motion blur in photographed images, offline rendering, and in real-time graphics provides the viewer with a sense of motion direction and also reduces temporal aliasing. When motion blur is present, the shadows of moving objects should be motion blurred as well. However, while shadow rendering has received a lot of attention in the research community for static scenes, rendering of motion blurred shadows has remained relatively unexplored.

Accumulation buffering can be used to generate motion blurred shadows, but the algorithm only supports using identical sample times for all pixels in the shadow map. This often shows up as banding artifacts unless many full-screen passes are used, and that is often not possible within the time budget for real-time rendering. Instead, one can use stochastic sampling when generating the shadow map. This removes banding artifacts by allowing samples to have unique times, but the resulting image is often too noisy at affordable sample rates. Deep shadow mapping is a technique originally intended for rendering shadows for hair, smoke, fur, etc. Motion blurred shadows can also be generated using deep shadow maps, however, they are only correct when the receiving object is static.

In the presence of motion blur, the problem of computing accurate shadows in a graphics engine is very difficult. Currently, the resulting shadows are often highly approximate, lack blur or are overly noisy. This is a consequence of the fact that the visibility integral (what light reaches a certain point from the light sources in the scene) needs to be evaluated both spatially and temporally. A common approximation of this integral is to use Monte Carlo sampling, wherein the scene is sampled at a certain number of spatial and temporal locations. However, unless a large number of samples are used, the shadows will be very noisy.

BRIEF DESCRIPTION OF THE DRAWINGS

Some embodiments are described with respect to the following figures:

FIG. 5A is an epipolar image of a simple scene according to one embodiment;

FIG. 5B is a depiction of sample reprojection to t=0.5 for each layer using the layer's motion vector for one embodiment;

FIG. 5C shows shadow maps queried at different times using the reprojected samples at t=0.5 for each layer along the layer's motion vector;

DETAILED DESCRIPTION

By filtering the motion blurred shadows to reduce this noise, useful shadows may be achieved at interactive rates or high quality shadows at a modest sample rate, in some embodiments. Such a shadow filter may take both spatial and temporal effects into account, which makes it non-trivial.

The basic principle is to enable a compact and filterable representative of a time-dependent shadow map, suitable for integration in a real-time stochastic rasterization pipeline. A shadow map operates in image space and uses a depth buffer to sort surfaces with respect to a light source line of sight. A geometry is projected from the viewpoint of the light source to determine which parts of objects have a clear line of sight to the light source.

The approach described herein has better quality (less noise) than current solutions and handles more cases, such as moving light sources and moving shadow receivers, which some previous work cannot handle, in some embodiments.

Figure 1:
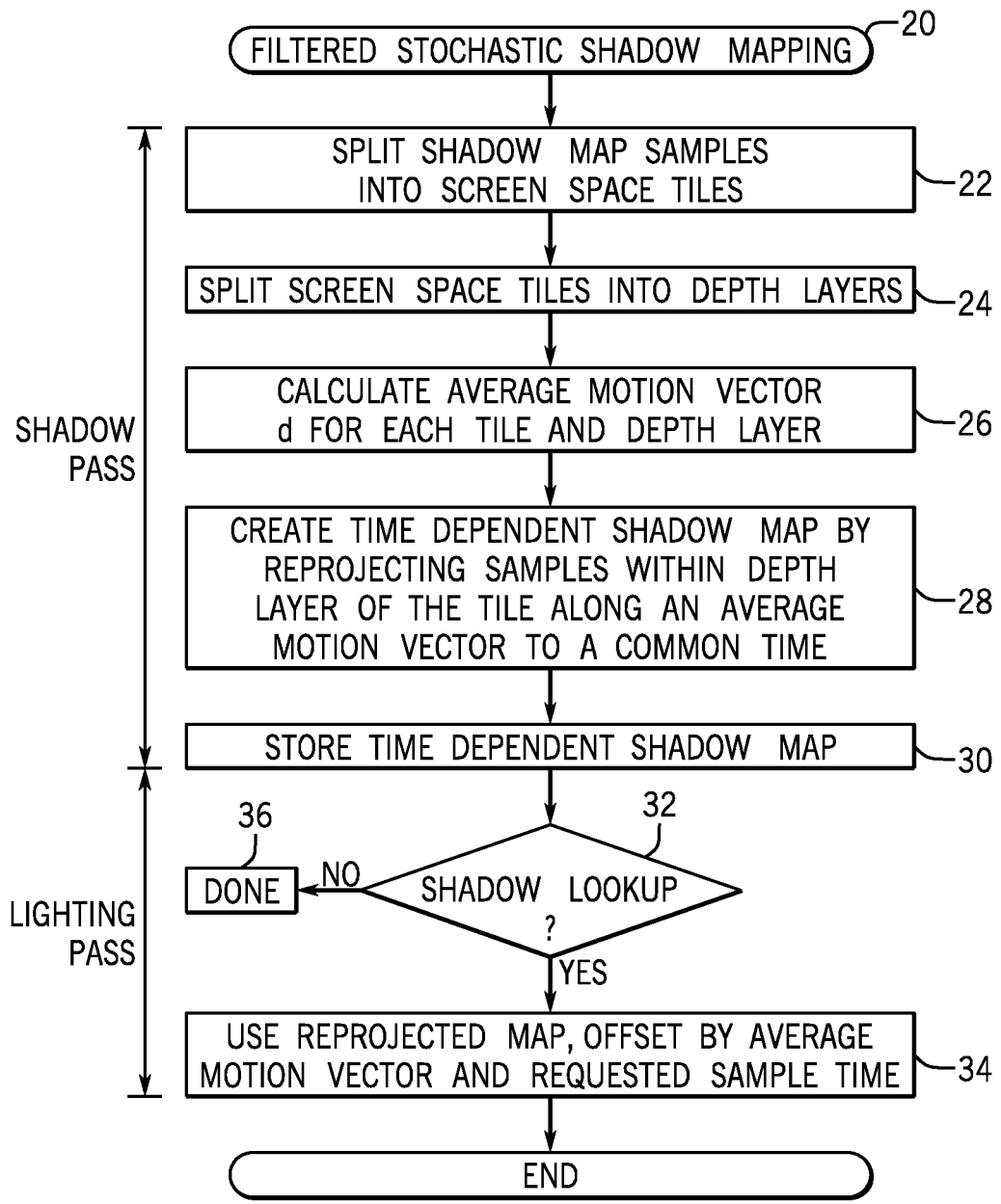
FIG. 1 is a flow chart for one embodiment.

A sequence 20 for filtered stochastic shadow mapping is shown in FIG. 1. The sequence may be implemented in software, firmware and/or hardware. In software and firmware embodiments it may be implemented by computer executed instructions stored in one or more non-transitory computer readable media such as magnetic, optical or semiconductor storage. In one embodiment, the instructions are stored in a graphics processing unit.

The shadow map samples are split into screen space tiles (block 22), and each tile is split into depth layers (block 24). The average motion vector d for each tile and depth layer is calculated (block 26). A depth layer of a tile may be called a "partition." Within each partition, the motion is assumed to be slowly varying. Given that assumption, all samples are reprojected within a partition along the average motion vector to a common time (block 28), and a compact representation of the time-dependent shadow map is stored (block 30).

At the shadow lookup (diamond 32), the reprojected map is used and offset by using the average motion vector and the requested sample time (block 34). If the shadow map is requested then perform the lookup in the map (block 34). Otherwise no lookup is done and the flow is complete (block 36).

The outgoing radiance from a point x in a direction $\omega_o$ is given by:

$$l(x,\omega_o) = \int_{\Omega_i} v(x,\omega_i) f(x,\omega_i,\omega_o) l(\omega_i) d\omega_i, \quad (1)$$

where v is the visibility function, $f$ is the Bidirectional Reflectance Distribution Function (BRDF) (including the cosine term), and $l(\omega_i)$ is the lighting. Only direct lighting from a set of discrete point light sources, $\{l_i\}$ is considered. The expression for the outgoing radiance can therefore be simplified to a sum over the light sources:

$$l(x, \omega_0) = \sum_i v(x, \omega_i) f(x, \omega_1, \omega_0) l_i \qquad (2)$$

Now, assume that the scene is dynamic, where the objects, lights, and the camera can move. The corresponding expression for the outgoing radiance at a certain time, t, can be expressed in a coordinate system following x as:

$$l(x, \omega_o(t), t) = \sum_i v(x, \omega_i(t), t) f(x, \omega_i(t), \omega_o(t)) l_i. \qquad (3)$$

This expression shows the outgoing radiance at x, but does not take into account occlusions between x and the camera.

The task at hand is to evaluate the occlusion term $v(x, \omega_i(t), t)$. In a ray tracer, one can simply answer this query with a shadow ray through the dynamic scene. In a stochastic rasterizer, one can instead query a time-dependent shadow map, which stores a light space depth value (z) for each spatio-temporal coordinate $(x_l, t)$. To do this, the query coordinate x in direction $\omega_i(t)$ is remapped into the moving coordinate system of the light (denoted with subscript l): $(x, \omega_i(t), t) \mapsto (x_l(t), t)$. If the shadow map depth is smaller than the light space depth of x, the light source, $l_i$, is occluded from x at time t.

Figure 2:
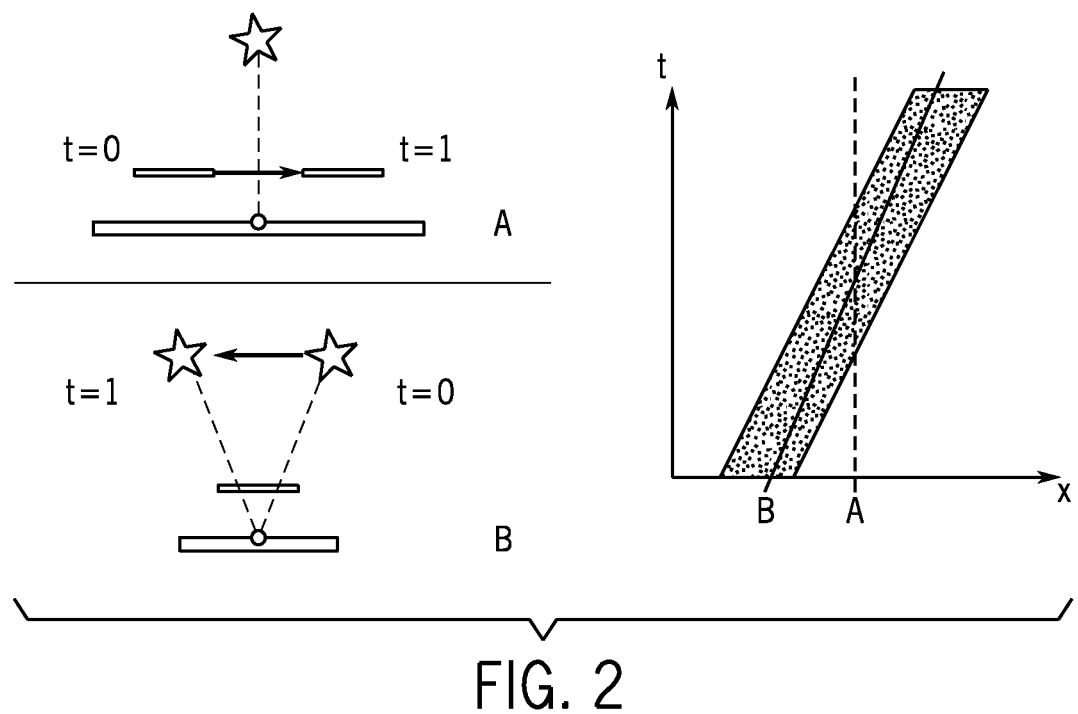
FIG. 2 is a depiction of shadow map lookups according to one embodiment.

To determine the color for each pixel, integrate over t to compute a blurred value over the open interval of the camera shutter. Hence, due to motion and the spatial pixel filter, many points will contribute to the blurred radiance value of each pixel. The shading evaluation may include multiple shadow map lookups within a spatio-temporal footprint, as illustrated in FIG. 2. In FIG. 2, on the left, scene A shows a static light source and a moving object, while scene B instead shows a moving light and a static object. In FIG. 2, on the right, two different scenes produce the same epipolar image, yet the observed shadows are very different. This is a consequence of that the receiver point footprint of the time-dependent receiver point in light space is different for the two scenes, as shown by the dashed lines in the epipolar image.

Furthermore, there may be discrete changes in primary visibility, as different primitives move over the pixel's view frustum over the temporal interval. In the general case, the camera, all objects and all lights may move in time. To approximate this result, one often take a large number of spatio-temporal Monte Carlo (MC) samples. However, with an estimate of the footprint in the spatio-temporal shadow map of hitpoints on visible primitives, one can apply filtered lookups in order to reduce shadow noise.

Due to perspective motion, $x_l(t)$ may be rational in t; however, in one embodiment a linear motion assumption is used in the shadow map representation described next.

A layered, filtered shadow mapping algorithm may be used for motion blurred shadows. The algorithm is divided into two passes, namely a shadow pass and a lighting pass. The shadow pass renders the scene using stochastic rasterization and generates a time-dependent shadow map augmented with per-sample motion vectors. The subsequent lighting pass renders the scene from the camera's point of view, and performs a shadow query for each sample seen from the camera.

In contrast to time-dependent shadow mapping (TSM), wherein the shadow query gives a binary result, (i.e., if the sample is in shadow or not), the algorithm estimates the temporal integral of the visibility term which results in smoother motion blurred shadows in some embodiments.

The algorithm is based on the assumption that the motion in a small spatial region of a depth layer is slowly varying. During the shadow pass, the stochastic shadow map is divided into screen space tiles, and samples of each tile are split into depth layers. For each tile and depth layer, an average motion vector d is computed.

If all spatio-temporal samples, $\{(x_i, t_i)\}$, in a layer move with the same motion vector d, then each sample's movement will be described by the following equation:

$$x(t) = x_i + d(t - t_i), \qquad (4)$$

where x(t) represents the hit point moving in time. At t=0.5, this hit point has a spatial coordinate:

$$x' = x_i + d(0.5 - t_i). \qquad (5)$$

With this observation, a compact time-dependent shadow map is created by reprojecting all samples along the average motion vector, d, in one embodiment to t=0.5 using Equation 5. At the shadow lookup in the lighting pass, this representation is offset along the motion vector to get the shadow map for a particular time. This layered version of the reprojected shadow map is stored in memory for use in the subsequent lighting pass.

Creating the shadow map representation involves a number of steps, which are covered next.

Visibility Sampling.

First, the scene is stochastically rasterized with N samples per pixel in (x, y, t) light space. For each sample, depth and motion vectors are stored. The motion vectors are comprised of the screen space motion in xy and the light space depth motion in z.

Depth Clustering.

Next, the samples in a screen space tile are clustered by depth to obtain a set of depth layers of samples. To find suitable depth layers, a simple depth clustering step is performed over all samples within a search window centered around each tile. First, the depth range $[z_{min}, z_{max}]$ of the samples is computed, which is then subdivided into uniform intervals. Intervals containing samples are flagged as occupied. The depth range is then split where the largest stretches of unoccupied intervals are found, and depth layers are created from the resulting sub-ranges.

Figure 3:
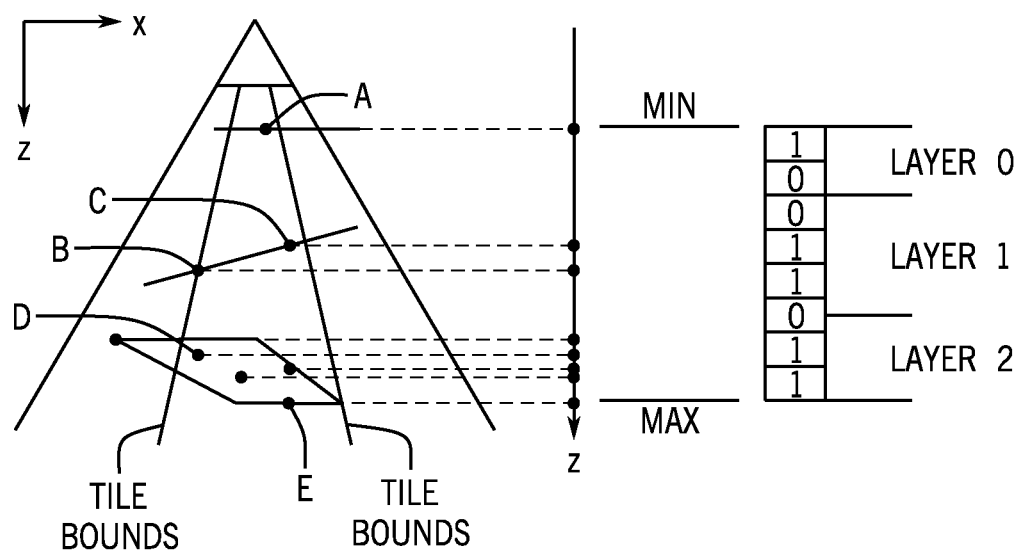
FIG. 3 is a depiction of a simple scene illustrating a clustering approach according to one embodiment.

This process is illustrated in FIG. 3. A depiction of a simple scene illustrating a clustering approach. The minimum and maximum depths, z, are found, and that interval is split uniformly into a set of bins. All samples are assigned to their corresponding bin, and each bin that contains at least one sample is marked with a 1. Finally, this bitmask is used to find a small set of depth layers by inserting a layer border in the longest sequence of bins marked with 0, and repeating the process until a desired number of layers has been created. In practice, 32 uniform bins clustered into (up to) four depth layers may be used in one embodiment.

Per-Layer Motion.

Assuming that the motion is slowly varying within each depth layer of the tile, a common representable motion vector, d, for the layer is found by averaging the motion vectors of the samples in the layer.

Grid Setup.

The reprojection step works with depth values instead of color by reprojecting onto a stretched grid, which is aligned with the average motion vector d. For clarity of presentation, let the (x, y) coordinates have origin at the center of the tile. Parameterize the stretched grid with coordinates, (u, v), where the u-axis is aligned with the layer's motion vector, d, and the v-axis is perpendicular.

Figure 4:
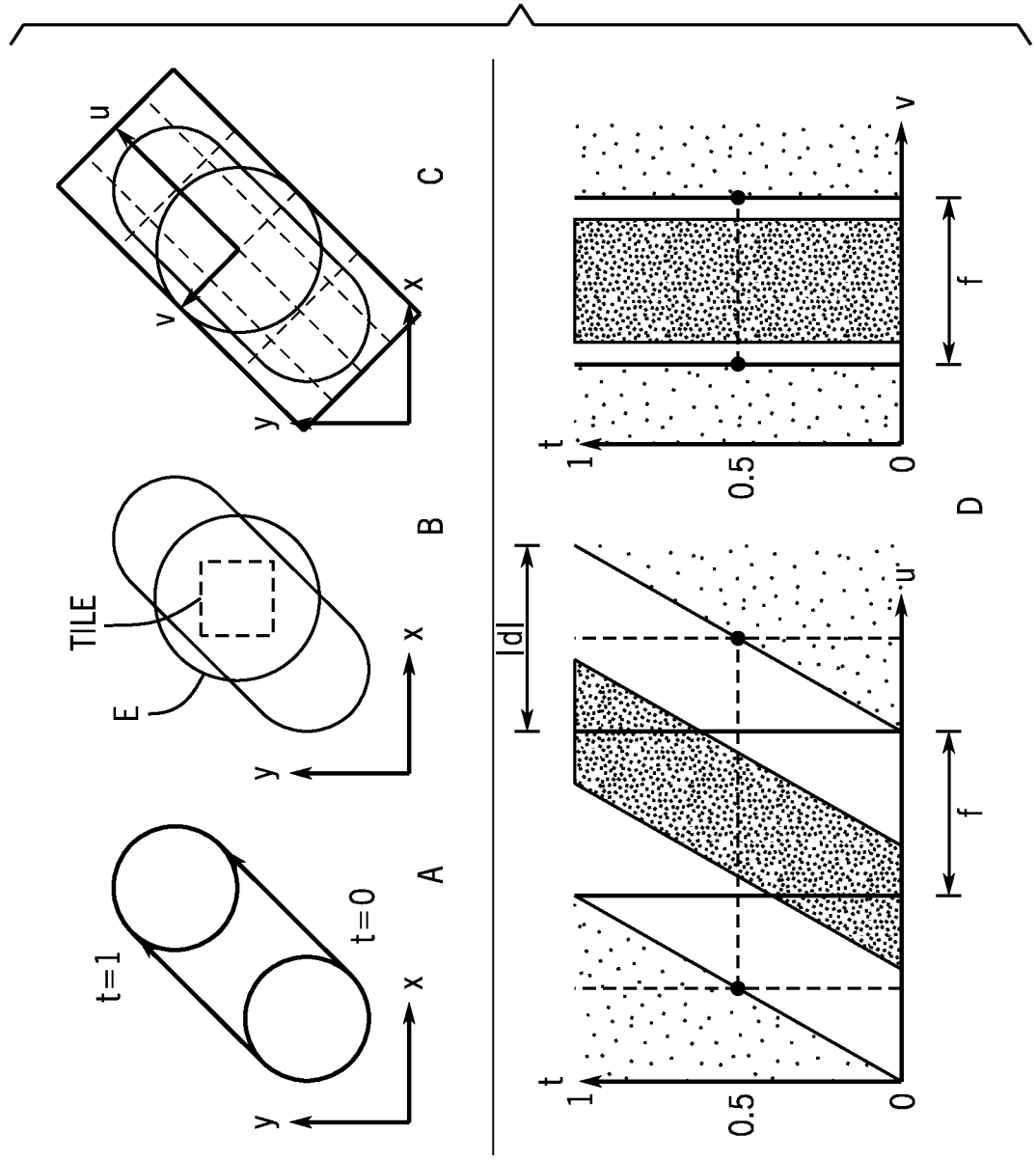
FIG. 4 is a depiction of a moving disc viewed from a light source under three circumstances.

As illustrated in FIG. 4, the grid is stretched from an initial size (including guard band), f, to f+|d|, which defines a scaling factor $$\frac{f}{f+|d|}$$

along the u-direction.

In FIG. 4, at A, a moving disc is illustrated, viewed from the light source. At B a single tile is in the middle of the disc image indicated in grey shadowing. The inner circle of the disc fully encloses the tile. Samples from within the circle E will be used for this tile. At C the average motion direction is found, and a new coordinate system, (u, v) in constructed. The u-axis is scaled and aligned with the motion vector. At D the epipolar images for v=0 (right) and u=0 (left) are shown. The final, reprojected layer representation will contain information about the region enclosed within the grey borders.

Now define a rotation and scaling transform, M, for each layer, such that $$Md = \left(\frac{f|d|}{f+|d|}, 0\right).$$

If one applies this transform to a moving sample: $x(t)=x_i + d(t-t_i)$, cf. Equation 4, one obtains the corresponding sample in the stretched grid as:

$$(u_i(t), v_i) = Mx_i + \left(\frac{f|d|}{f+|d|}, 0\right)(t-t_i). \quad (6)$$

In presence of motion, the grid stretches outside the tile bounds as shown in FIG. 4 at D.

Sample Reprojection.

For each layer, each sample is transformed to the local coordinate system and is moved along the layer's motion vector to the middle of the shutter interval, by using Equation 6 with t=0.5. Additionally, the depth of the sample at t=0.5, $z_i^{reproj}=z_i+(0.5-t_i)d_z$ is computed. The sample's position in uv-space directly maps to a texel location in the shadow map.

The next step is to compute the coverage and depth contribution of the sample to the texel. To do this, three quantities are used, which are described next. First, the depth value for the shadow test is obtained using the filterable variance shadow map (VSM) representation with first and second depth moments (z and $z^2$). The next quantity is the opacity, α, which tells how much each layer and texel should contribute to the final shadow result. The remaining quantity is the weight, w, of the filter kernel used in the reprojection. Each sample will contribute with different $α_i$ and $w_i$ values for each layer. In the shadow map, for each texel, (u, v), these quantities are accumulated into a tuple with four elements on the form:

$$T(u,v)=(\Sigma w_i α_i z_i, \Sigma w_i α_i z_i^2, \Sigma w_i α_i, \Sigma w_i) \quad (7)$$

i.e., a weighted sum of the first and second depth moments, a weighted opacity, and the total weight.

The values of $w_i$ and $α_i$ for the current layer are calculated as follows. If a sample lies in or behind the current layer (i.e., further away from the light source), then $w_i$ has a non-zero value based on the filter used. Otherwise, $w_i=0$ (i.e., the sample does not contribute to this layer). The opacity value is one ($a_i=1$) if the sample lies within the layer, and is zero otherwise. The idea behind this is that if a sample that belongs to a background layer is visible through the foreground layer, then the foreground layer must be transparent for that sample. Since fewer samples affect layers further back, this implies that the opacity estimate is better for foreground layers.

FIGS. 5A and 5B illustrate a simple example of the reprojection process. FIG. 5A is an epipolar image of a simple scene, which is depicted with two objects and a static background layer. In FIG. 5B the samples are reprojected to t=0.5 for each layer, using the layer's motion vector. Samples 10 within a layer increase the opacity. Samples 12 behind the layer (further from the light source) decrease the opacity. Samples in front of the layer (crosses 14) are discarded. In FIG. 5C the shadow map can be queried at different times using the reprojected samples at t=0.5 for each layer along the layer's motion vector.

In the lighting pass, the scene is rendered from the camera using stochastic rasterization, searching for the amount of light that reaches a receiver sample, $(x_r, z_r, t_r)$. For every receiver sample, the corresponding tile in the shadow map is found, and the visibility contribution of its layers are combined to a final shadow term.

The shadow map is compactly represented as a set of layers at t=0.5 with the accompanying coordinate transforms M. To retrieve a shadow map value for a particular layer at receiver time $t_r$, the receiver sample $(x_r, t_r)$ is reprojected using Equation 3 with t=0.5. The reprojected coordinate maps to a location in the shadow map.

Furthermore, one may account for the camera footprint when performing a shadow map lookup. Since the camera, light, and receiver point may move, this is an anisotropic footprint in xyt in general. First, make the assumption that the receiver point is static in camera space for a short duration around the receiver sample time $t_r$. The duration is inversely proportional to the number of samples per pixel, N, used in the lighting pass. The camera filter end points are approximated by transforming the receiver point to light space at times $$t_r - \frac{1}{2N}$$

and $$t_r + \frac{1}{2N}.$$

Figure 6:
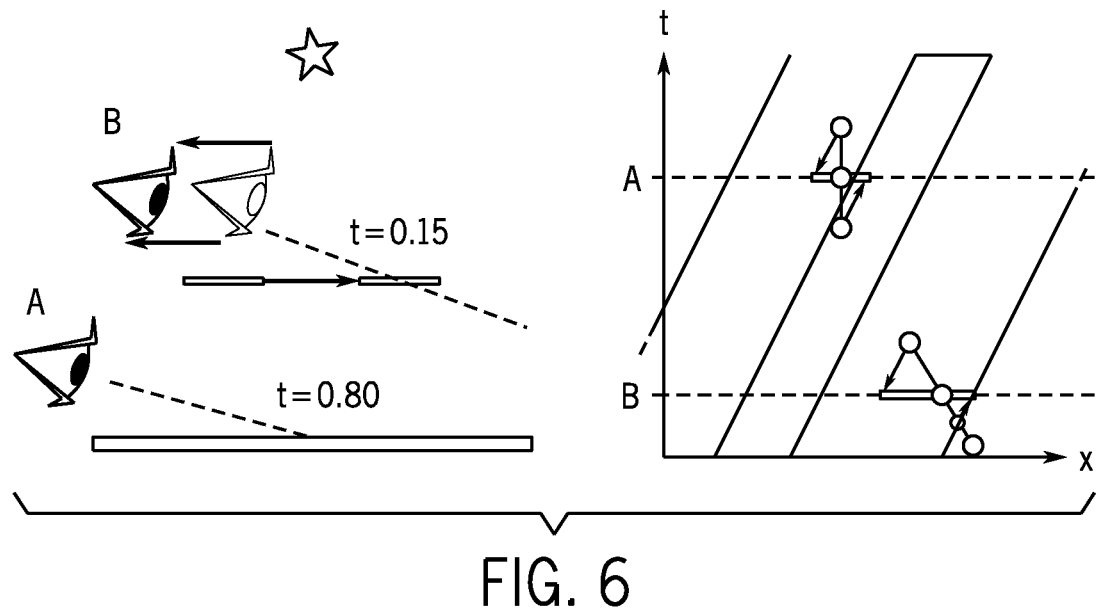
FIG. 6 shows how to calculate the filter footprint for a moving layer, for two embodiments.

FIG. 6 shows two examples of how the footprints are obtained. Should the footprint stretch outside the layer's allotted region in the shadow map, it must be clamped to avoid fetching invalid data from a neighboring tile. The size of the guard band, $f$, used in coordinate transform M determine how far outside the original tile the footprint may stretch. In case A the camera and the light are static, and thus the filter in the epipolar image is a vertical line. Reprojecting the filter end points along the motion vector gives the final filter footprint. In case B the camera is moving in the opposite direction to the layer and produces a slanted trail in the epipolar image. The footprint stretches outside the region that can be reconstructed for this layer, and is clamped. In these examples, we use filter footprints of ¼ of the shutter interval.

The shadow map location, along with the footprint axes as gradient vectors, are used in the hardware anisotropic filtering to retrieve a tuple on the form given in Equation 7. From this, one may derive:

$$\bar{z} = \frac{\sum w_i \alpha_i z_i}{\sum w_i \alpha_i}, \overline{z^2} = \frac{\sum w_i \alpha_i z_i^2}{\sum w_i a_i}, \bar{\alpha} = \frac{\sum w_i \alpha_i}{\sum w_i}. \quad (8)$$

With $\bar{z}$ and, $\overline{z^2}$ one may compute a visibility term, V, using a standard variance shadow map (VSM) test with two moments. Base the test on the receiver point depth moved to the projected shadow map time $z_r^{reproj}(t_r) = z_r + (0.5 - t_r)d_w - b$, where $t_r$ is the receiver sample time and b is a small shadow bias term. Moving the receiver sample to t=0.5 is equivalent to moving the depth of the shadow casting sample to the time of the receiver sample, $t_r$. Given $\bar{z}$ and $\sigma^2 = \overline{z^2} - \bar{z}^2$, the variance shadow map visibility is computed as follows:

$$V = \frac{\sigma^2}{\sigma^2 + (z_r^{reproj} - \bar{z})^2}. \quad (9)$$

Combined with the opacity of the layer at the point of lookup, $\alpha_i$, one can approximate the visibility of the receiver point through this particular layer as:

$$V_i = 1 - \bar{\alpha}(1 - V) \quad (10)$$

The visibility through all layers is accumulated using $V_{total} = \Pi_l V_l$ to get a final visibility approximation.

The algorithm and time-dependent stochastic shadow map (TSM) in a graphics processing unit software stochastic rasterizer, may be implemented with shadow maps and faster coverage tests.

A time-dependent shadow mapping algorithm supports high quality filtering and accurately handles time dependencies between shadow casters and receivers in some embodiments. The algorithm has real-time performance for reasonably complex scenes and scales with the number of samples, rather than geometrical complexity. It is therefore well suited for high quality rendering in some embodiments.

Figure 7:
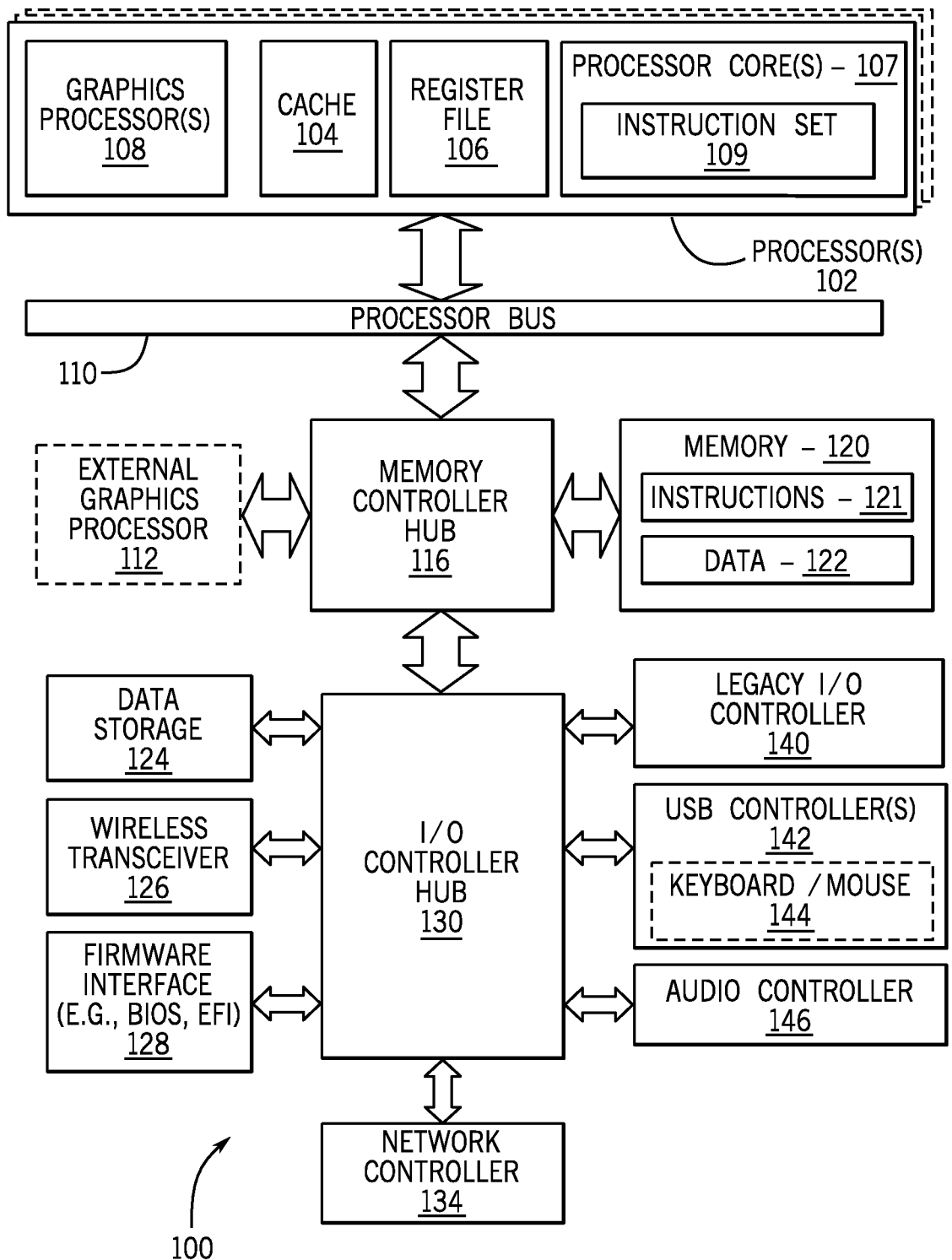
FIG. 7 is a schematic depiction of a graphics rendering system according to one embodiment.

FIG. 7 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

Figure 8:
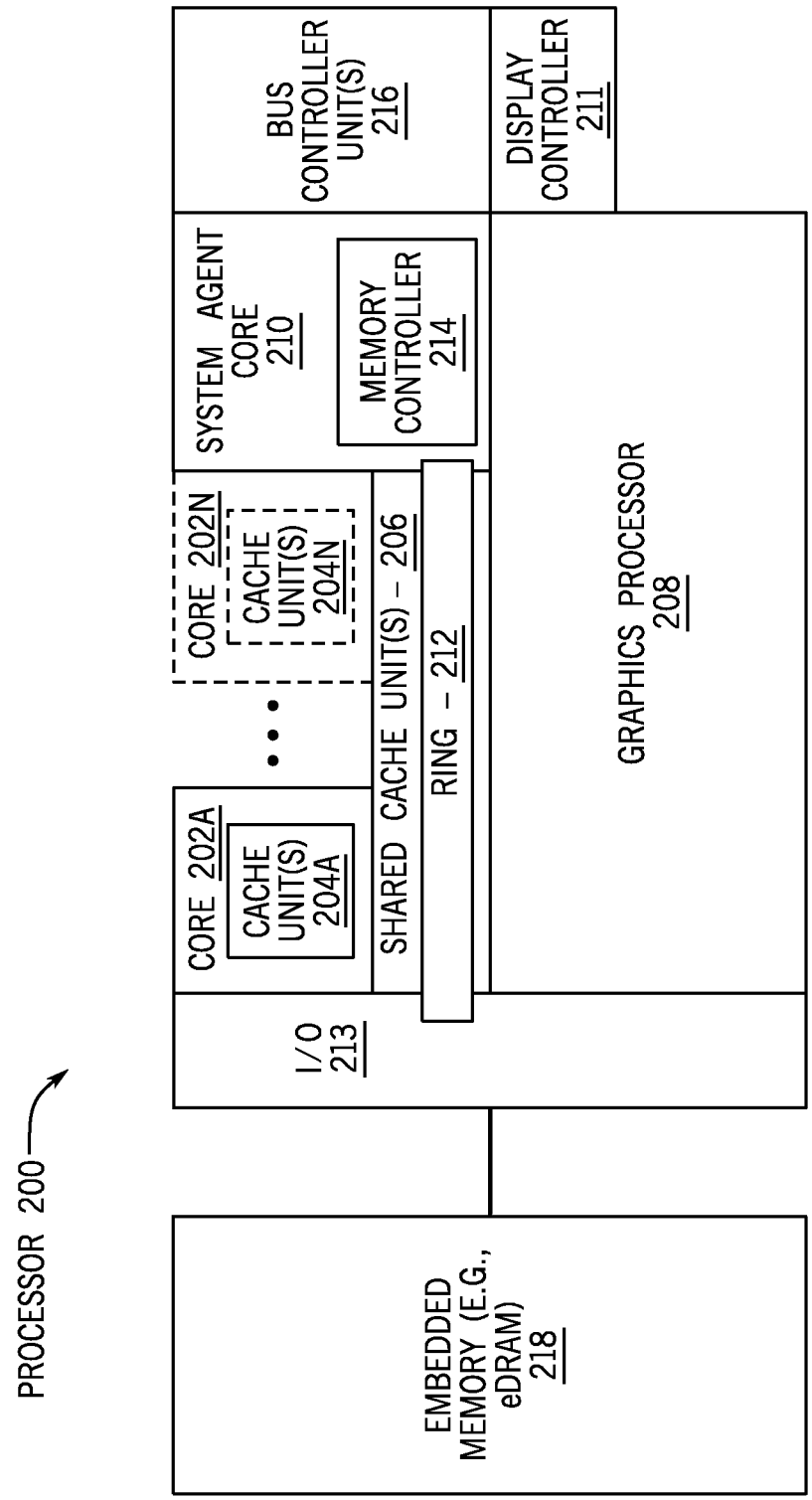
FIG. 8 is a block diagram of a data processing system according to one embodiment.

FIG. 8 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

Figure 9:
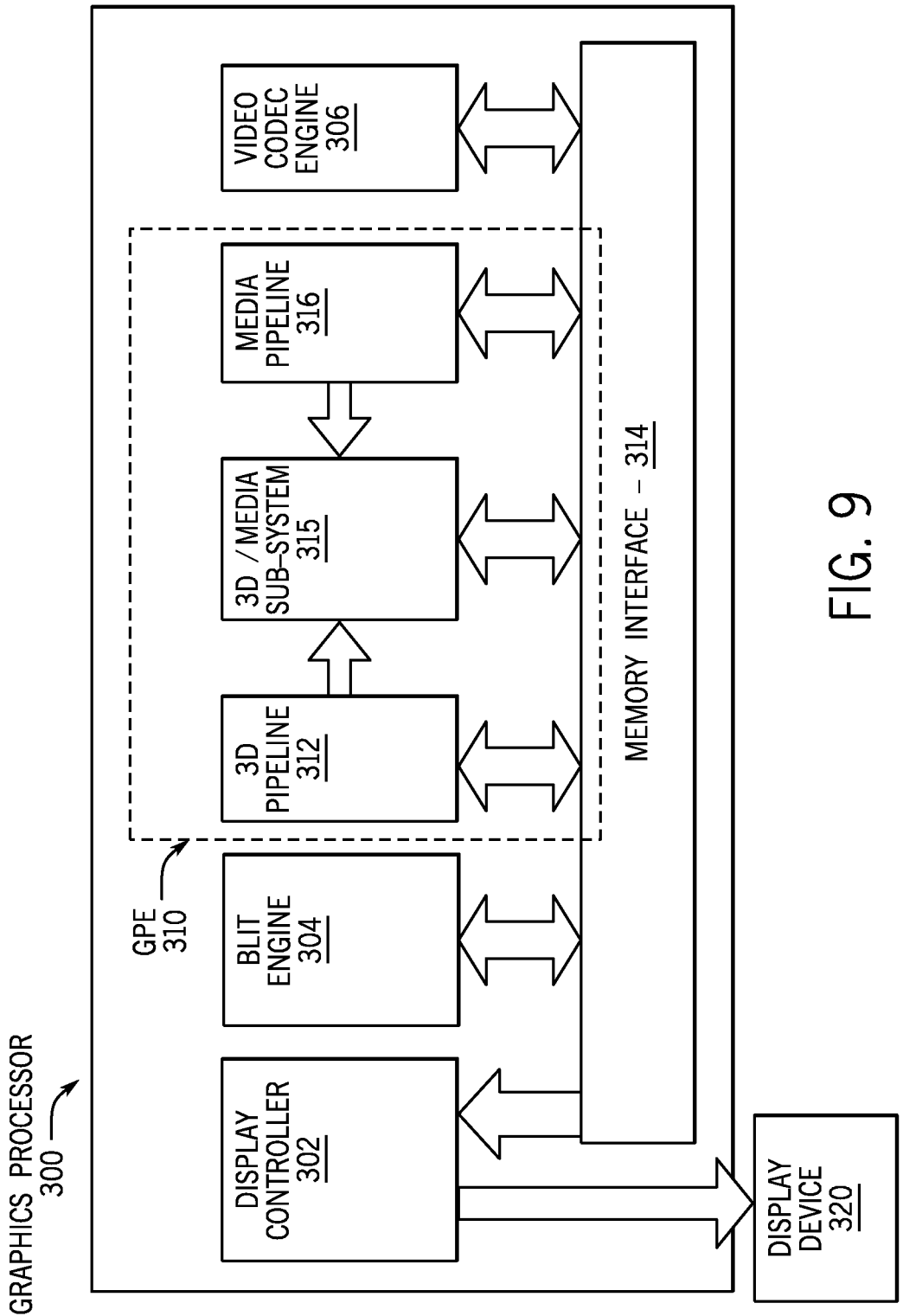
FIG. 9 is a block diagram of the processor shown in FIG. 8 according to one embodiment.

FIG. 9 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 10:
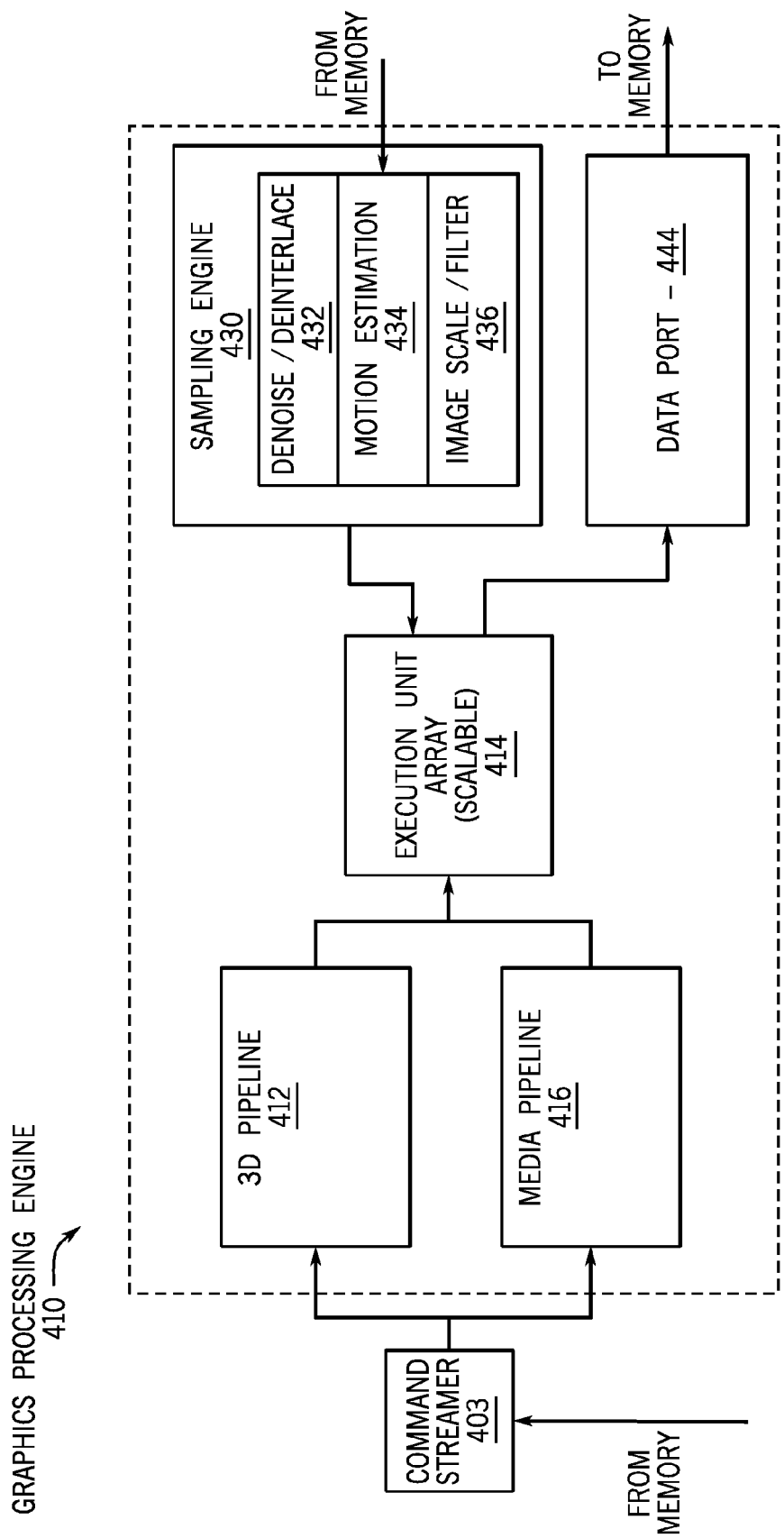
FIG. 10 is a block diagram of the graphics processor of FIG. 8 according to one embodiment.

FIG. 10 is a block diagram of an embodiment of a graphics processing engine 410 for a graphics processor. In one embodiment, the graphics processing engine (GPE) 410 is a version of the GPE 310 shown in FIG. 9. The GPE 410 includes a 3D pipeline 412 and a media pipeline 416, each of which can be either different from or similar to the implementations of the 3D pipeline 312 and the media pipeline 316 of FIG. 10.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 11:
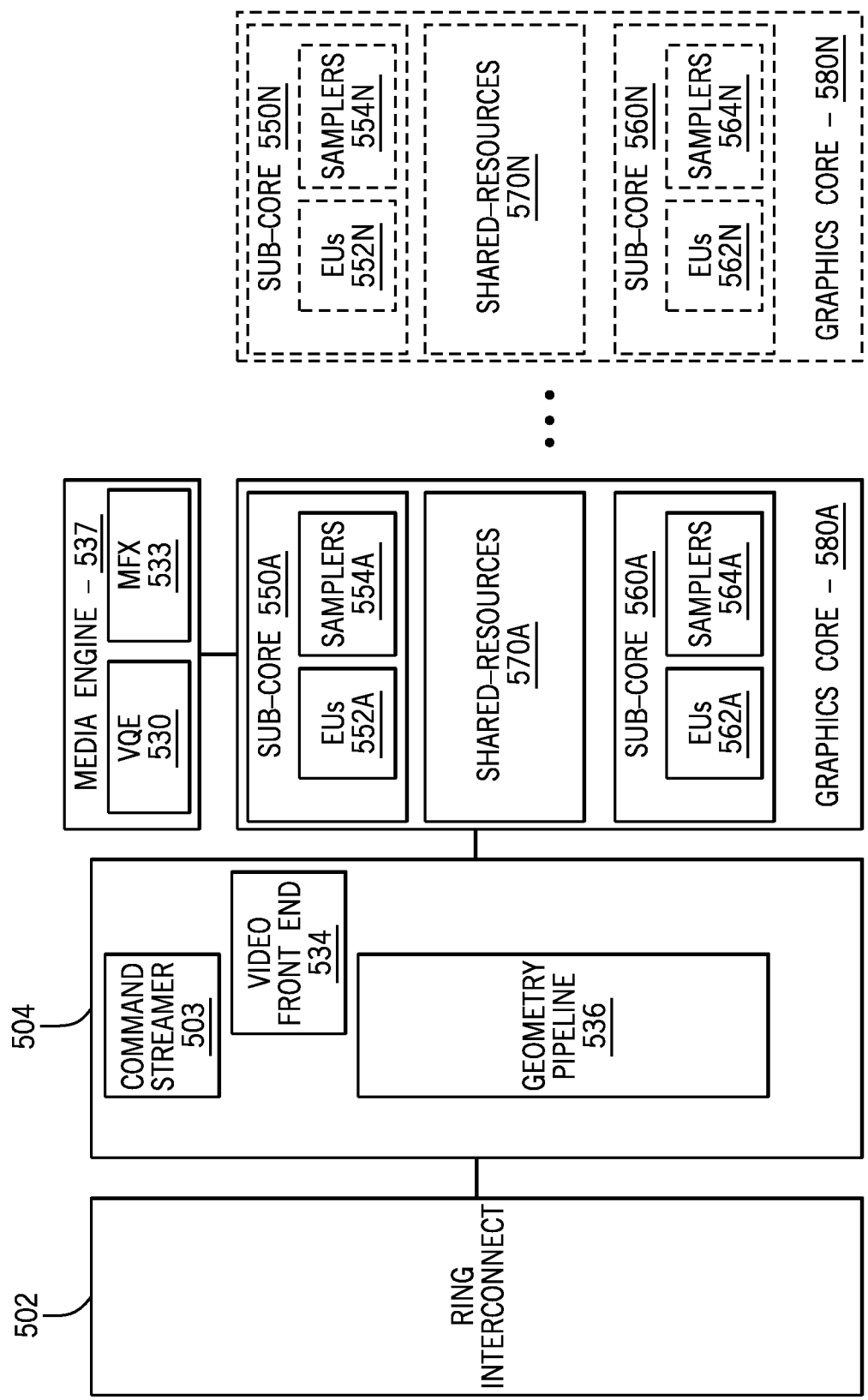
FIG. 11 is a block diagram of a graphics processing engine according to one embodiment.

FIG. 11 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

Figure 12:
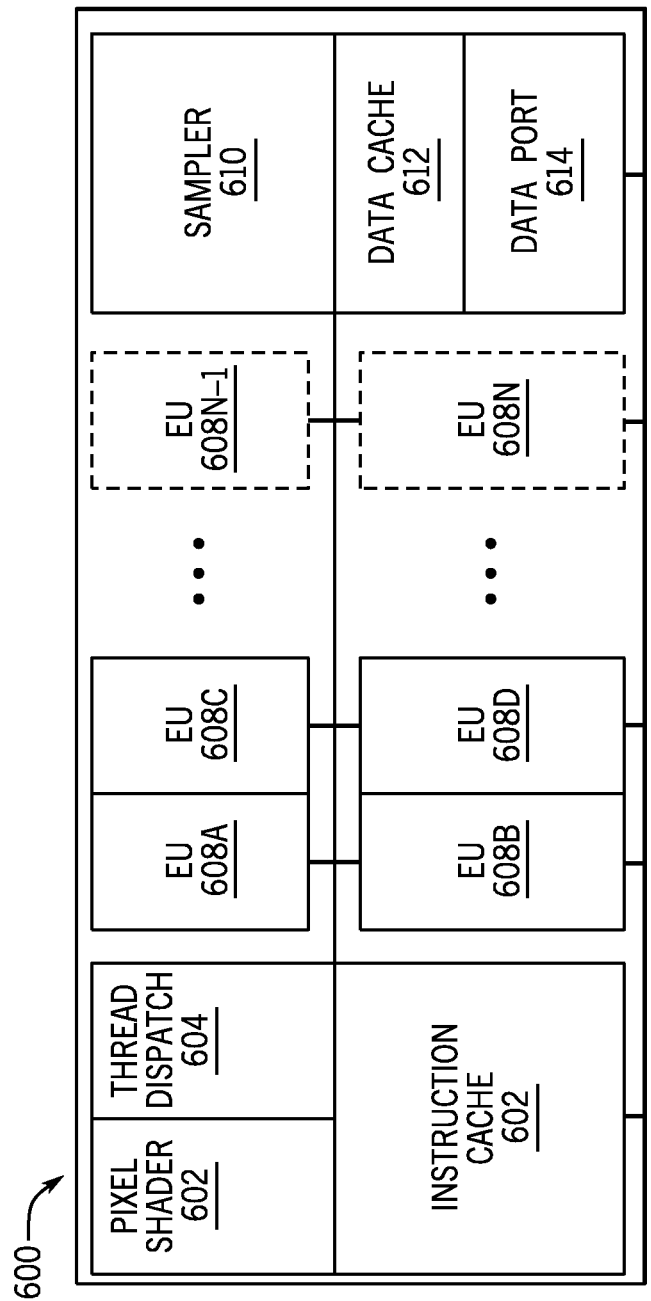
FIG. 12 is a block diagram of a graphics processor according to another embodiment.

FIG. 12 illustrates thread execution logic 600 including an array of processing elements employed in one embodiment of a graphics processing engine. In one embodiment, the thread execution logic 600 includes a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 11) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

Figure 13:
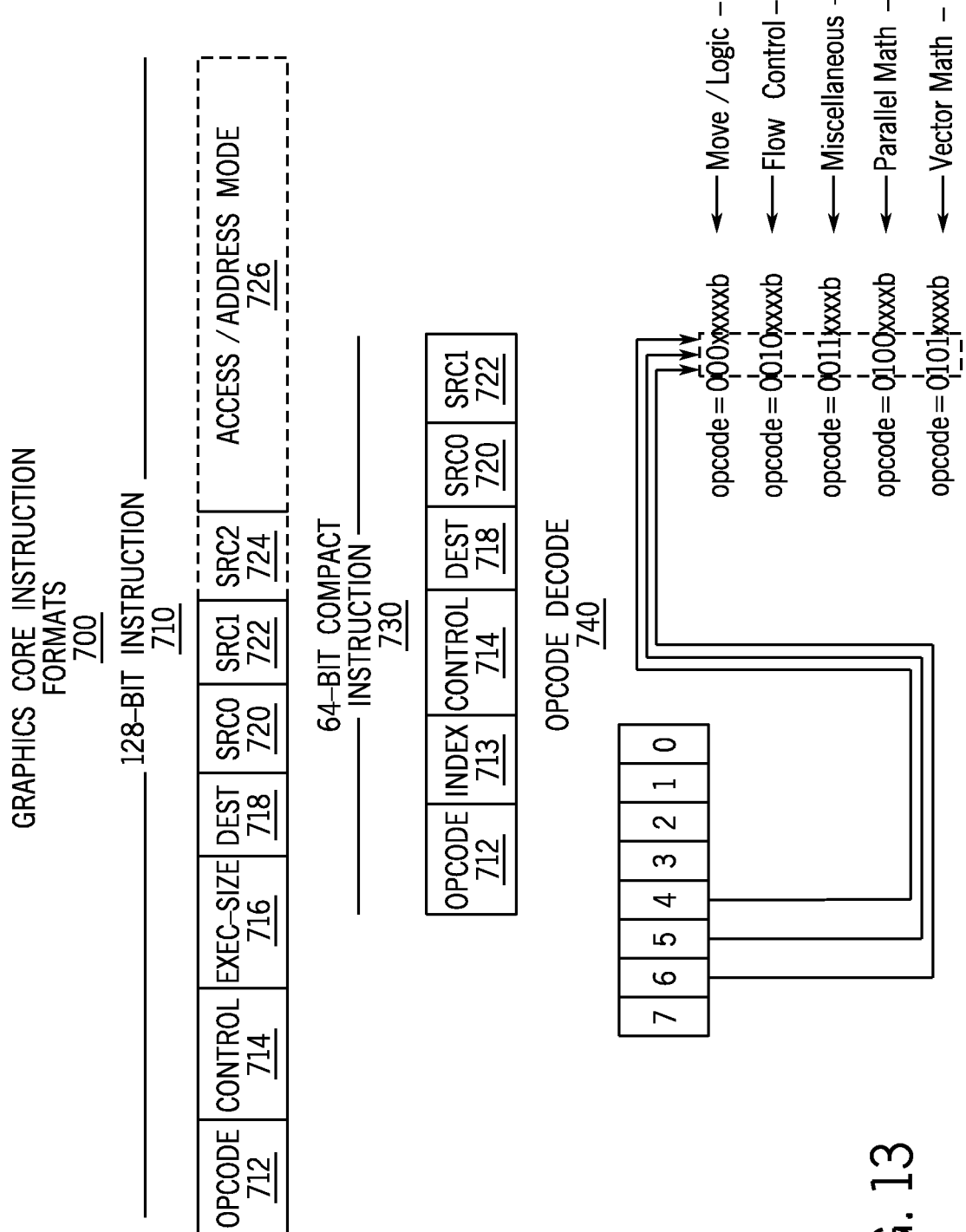
FIG. 13 illustrates thread execution logic for one embodiment.

FIG. 13 is a block diagram illustrating a graphics processor execution unit instruction format according to an embodiment. Access to the fixed function accelerator described earlier may be mapped to an instruction (send message) described here. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001 xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 14:
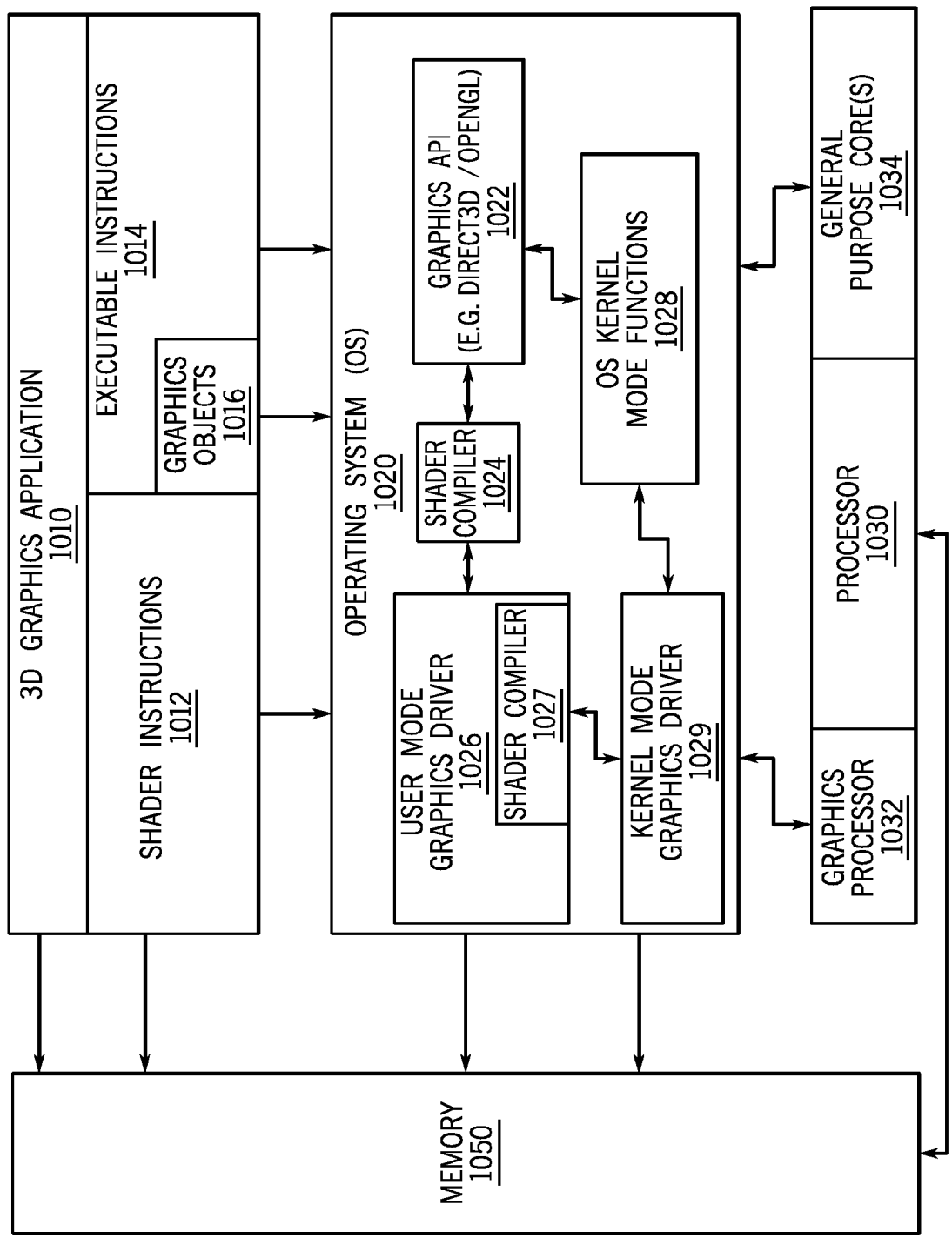
FIG. 14 is a graphics software architecture for one embodiment.

FIG. 14 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. The shader compiler fuses coarse- and pixel-rate phases into one monolithic program and adds 'glue code' around as described in connection with the earlier monolithic program description. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

The following clauses and/or examples pertain to further embodiments:

One example embodiment may be a method comprising splitting shadow map samples into screen space tiles, splitting a screen space tile into depth layers, calculating an average motion vector for said depth layers and reprojecting samples within a depth layer along an average motion vector to a common time. The method may also include at shadow lookup, using said reprojected samples offset by an average motion vector and requested sample times. The method may also include stochastically rasterizing in light space. The method may also include clustering screen space samples of the tile by depth, to form a set of depth layers of samples. The method may also include computing said average motion of a depth layer by computing the averaging motion vectors of the samples falling in that depth layer. The method may also include wherein reprojecting includes stretching a grid aligned with a direction of the average motion vector. The method may also include stretching by a scaling factor that is a function of an initial grid size and the magnitude of the average motion vector. The method may also include computing opacity and depth contribution of a sample to a shadow map texel. The method may also include obtaining a depth value using opacity, a filterable variance shadow map representation with first and second depth moments together with a weight of a filter kernel used in the reprojection. The method may also include determining final visibility by compositing the depth layers together based on each layer's opacity value.

In another embodiment one or more non-transitory computer readable media storing instructions executed to perform a sequence comprising splitting shadow map samples into screen space tiles, splitting a screen space tile into depth layers, calculating an average motion vector for said depth layers, and reprojecting samples within a depth layer along an average motion vector to a common time. The media may also include said sequence including, at shadow lookup, using said reprojected samples offset by an average motion vector and requested sample times. The media may also include said sequence including stochastically rasterizing in light space. The media may also include said sequence including clustering screen space samples of the tile by depth, to form a set of depth layers of samples. The media may also include said sequence including computing said average motion of a depth layer by computing the averaging motion vectors of the samples falling in that depth layer. The media may also include wherein reprojecting includes stretching a grid aligned with a direction of the average motion vector. The media may also include said sequence including stretching by a scaling factor that is a function of an initial grid size and the magnitude of the average motion vector. The media may also include said sequence including computing opacity and depth contribution of a sample to a shadow map texel. The media may also include said sequence including obtaining a depth value using opacity, a filterable variance shadow map representation with first and second depth moments together with a weight of a filter kernel used in the reprojection. The media may also include said sequence including determining final visibility by compositing the depth layers together based on each layer's opacity value.

Another example embodiment may be an apparatus comprising a hardware processor to split shadow map samples into screen space tiles, split a screen space tile into depth layers, calculate an average motion vector for said depth layers, and reproject samples within a depth layer along an average motion vector to a common time, and a storage coupled to said processor. The apparatus may include said processor to at shadow lookup, using said reprojected samples offset by an average motion vector and requested sample times. The apparatus may include said processor to stochastically rasterize in light space. The apparatus may include said processor to cluster screen space samples of the tile by depth, to form a set of depth layers of samples. The apparatus may include said processor to compute said average motion of a depth layer by computing the averaging motion vectors of the samples falling in that depth layer. The apparatus may include said processor to stretch a grid aligned with a direction of the average motion vector. The apparatus may include said processor to stretch by a scaling factor that is a function of an initial grid size and the magnitude of the average motion vector. The apparatus may include said processor to compute opacity and depth contribution of a sample to a shadow map texel. The apparatus may include said processor to obtain a depth value using opacity, a filterable variance shadow map representation with first and second depth moments together with a weight of a filter kernel used in the reprojection. The apparatus may include said processor to determine final visibility by compositing the depth layers together based on each layer's opacity value.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
splitting shadow map samples into screen space tiles;
splitting one of said screen space tiles into depth layers;
calculating an average motion vector for one of said depth layers;
reprojecting samples within the one of said depth layers along the average motion vector to a common time; and
generating a depiction for display of motion blurred shadows using said reprojected samples.

2. The method of claim 1 including, at shadow lookup, using said reprojected samples offset by the average motion vector.

3. The method of claim 1 including stochastically rasterizing in light space.

4. The method of claim 1 including clustering samples in the screen space tiles by depth, to form a set of depth layers of samples.

5. The method of claim 4 including computing said average motion vector of said depth layer by computing an average motion vector of the samples falling in that depth layer.

6. The method of claim 1 wherein reprojecting includes stretching the samples within said depth layer in a direction of the average motion vector.

7. The method of claim 6 including stretching by a scaling factor that is a function of an initial size of the samples and a magnitude of the average motion vector.

8. The method of claim 1 including computing opacity and depth contribution of a sample to a shadow map texel.

9. The method of claim 8 including obtaining a depth value using the opacity, and a filterable variance shadow map representation with first and second depth moments.

10. The method of claim 9 including determining final visibility by compositing the depth layers together based on the opacity.

11. One or more non-transitory computer readable media storing instructions executed to perform a sequence comprising:
   splitting shadow map samples into screen space tiles;
   splitting a screen space tiles into depth layers;
   calculating an average motion vector for one of said depth layers;
   reprojecting samples within the one of said depth layers along the average motion vector to a common time; and
   generating a depiction for display of motion blurred shadows using said reprojected samples.

12. The media of claim 11, said sequence including, at shadow lookup, using said reprojected samples offset by the average motion vector.

13. The media of claim 11, said sequence including stochastically rasterizing in light space.

14. The media of claim 11, said sequence including clustering samples in screen space tiles by depth, to form a set of depth layers of samples.

15. The media of claim 14, said sequence including computing said average motion vector of said depth layer by computing an average motion vector of the samples falling in that depth layer.

16. The media of claim 11 wherein reprojecting includes stretching the samples within said depth layer in a direction of the average motion vector.

17. The media of claim 16, said sequence including stretching by a scaling factor that is a function of an initial size of the samples and a magnitude of the average motion vector.

18. The media of claim 11, said sequence including computing opacity and depth contribution of a sample to a shadow map texel.

19. The media of claim 18, said sequence including obtaining a depth value using the opacity, and a filterable variance shadow map representation with first and second depth moments.

20. The media of claim 19, said sequence including determining final visibility by compositing the depth layers together based on the opacity.

21. An apparatus comprising:
   a hardware processor to split shadow map samples into screen space tiles, split a screen space tiles into depth layers, calculate an average motion vector for one of said depth layers, reproject samples within the one of said depth layers along the average motion vector to a common time, and generate a depiction for display of motion blurred shadows using said reprojected samples; and
   a storage coupled to said processor.

22. The apparatus of claim 21, said processor to at shadow lookup, using said reprojected samples offset by the average motion vector.

23. The apparatus of claim 21, said processor to stochastically rasterize in light space.

24. The apparatus of claim 21, said processor to cluster samples in the screen space tiles by depth, to form a set of depth layers of samples.

25. The apparatus of claim 24, said processor to compute said average motion vector of the depth layer by computing an average motion vector of the samples falling in that depth layer.

26. The apparatus of claim 21, said processor to stretch the samples within said depth layer in a direction of the average motion vector.

27. The apparatus of claim 26, said processor to stretch by a scaling factor that is a function of an initial size of the samples and a magnitude of the average motion vector.

28. The apparatus of claim 21, said processor to compute opacity and depth contribution of a sample to a shadow map texel.

29. The apparatus of claim 28, said processor to obtain a depth value using the opacity, and a filterable variance shadow map representation with first and second depth moments.

30. The apparatus of claim 29, said processor to determine final visibility by compositing the depth layers together based on the opacity.

* * * * *